(12) United States Patent
Harvey

(10) Patent No.: US 12,426,138 B2
(45) Date of Patent: Sep. 23, 2025

(54) LED HEADLIGHT ASSEMBLY AND CONTROL

(71) Applicant: Tesla, Inc., Austin, TX (US)

(72) Inventor: Ross Harvey, Sunnyvale, CA (US)

(73) Assignee: Tesla, Inc., Austin, TX (US)

( * ) Notice: Subject to any disclaimer, the term of this patent is extended or adjusted under 35 U.S.C. 154(b) by 19 days.

(21) Appl. No.: 18/012,202

(22) PCT Filed: Jun. 23, 2021

(86) PCT No.: PCT/US2021/038658
§ 371 (c)(1),
(2) Date: Jul. 10, 2023

(87) PCT Pub. No.: WO2021/262835
PCT Pub. Date: Dec. 30, 2021

(65) Prior Publication Data
US 2023/0262858 A1 Aug. 17, 2023

Related U.S. Application Data

(60) Provisional application No. 63/043,467, filed on Jun. 24, 2020.

(51) Int. Cl.
*H05B 45/325* (2020.01)
*B60Q 1/14* (2006.01)
(Continued)

(52) U.S. Cl.
CPC ......... *H05B 45/325* (2020.01); *B60Q 1/1407* (2013.01); *H05B 45/46* (2020.01); *H05B 45/48* (2020.01)

(58) Field of Classification Search
None
See application file for complete search history.

(56) References Cited

U.S. PATENT DOCUMENTS 9,820,343 B1    11/2017  Fragiacomo et al.
10,085,314 B1 *  9/2018  Milanesi ............ H05B 45/3725
(Continued)

FOREIGN PATENT DOCUMENTS

CA      3183884      12/2021
CN      107660015     2/2018
(Continued)

OTHER PUBLICATIONS

International Search Report and Written Opinion for International Application No. PCT/US2021/038658, Notification mailed Nov. 12, 2021.

(Continued)

*Primary Examiner* — Kenneth B Wells
(74) *Attorney, Agent, or Firm* — Schwegman Lundberg & Woessner, P.A.

(57) ABSTRACT

The present disclosure includes methods and systems for creating, using, and controlling LED headlight topologies and matrices that require fewer parts, electricity, and power, while allowing for advanced features such as bend lighting. The disclosed methods and systems can enable the use of smaller electrical systems, including control systems for LED and other headlight topologies. The disclosed methods and systems can also take advantage of pixel pairing and time multiplexing, among other methods, to manage electrical flow to minimize power needed over the circuit at given times, thus reducing the amount of material needed to create the LED headlight topology and related methods and systems for creating, using, and controlling the LED headlight topology.

20 Claims, 11 Drawing Sheets

(51) Int. Cl.
   *H05B 45/46* (2020.01)
   *H05B 45/48* (2020.01)

(56) References Cited

U.S. PATENT DOCUMENTS

| | | | |
|---|---|---|---|
| 2014/0175978 | A1 | 6/2014 | Kobayashi |
| 2015/0256071 | A1* | 9/2015 | Penzo .................... H05B 45/48 315/297 |
| 2017/0008447 | A1 | 1/2017 | Fukui et al. |
| 2017/0129392 | A1 | 5/2017 | Kay et al. |
| 2018/0056853 | A1 | 3/2018 | Muramatsu et al. |

FOREIGN PATENT DOCUMENTS

| | | |
|---|---|---|
| CN | 107787084 | 3/2018 |
| CN | 110190653 | 8/2019 |
| CN | 116058075 | 5/2023 |
| EP | 4173443 | 5/2023 |
| HK | 40091403 | 12/2023 |
| JP | 2009134933 | 6/2009 |
| JP | 2023531716 | 7/2023 |
| KR | 20230029772 | 3/2023 |
| WO | 2016104282 | 6/2016 |
| WO | 2018047915 | 3/2018 |
| WO | 2021262835 | 12/2021 |

OTHER PUBLICATIONS

"International Application Serial No. PCT US2021 038658, International Preliminary Report on Patentability mailed Jan. 5, 2023", 9 pgs.
"European Application Serial No. 21745869.4, Response to Communication pursuant to Rules 161(1) and 162 EPC filed Jul. 27, 2024", 34 pgs.
"European Application Serial No. 25151683.7, Extended European Search Report mailed Apr. 4, 2025", 8 pgs.
"Japanese Application Serial No. 2022-579937, Notification of Reasons for Rejection mailed May 27, 2025", W English Translation, 6 pgs.
"Chinese Application Serial No. 202180057980.7, Office Action mailed Aug. 16, 2025", w English translation, 16 pgs.

\* cited by examiner

FIG. 3A

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 |
|---|---|---|---|---|---|---|---|---|---|---|---|---|---|---|---|---|---|---|---|---|---|---|---|---|---|---|---|---|
| 1 | | | | 5.5% | 7.1% | 8.8% | 10.2% | 11.3% | 12.0% | 13.0% | 14.1% | 14.7% | 15.5% | 16.0% | 16.3% | 16.6% | 16.5% | 16.0% | 15.4% | 14.1% | 12.5% | 10.9% | 9.3% | 8.2% | 7.1% | | | |
| 2 | | | 4.9% | 8.1% | 11.7% | 15.6% | 19.5% | 21.8% | 22.8% | 24.2% | 25.4% | 26.8% | 29.1% | 31.5% | 33.8% | 35.4% | 36.5% | 36.0% | 34.1% | 29.8% | 24.8% | 19.6% | 16.1% | 12.5% | 9.9% | 7.9% | | |
| 3 | 3.3% | 6.4% | 10.0% | 15.8% | 24.5% | 30.7% | 34.2% | 38.3% | 41.1% | 43.9% | 48.2% | 52.4% | 58.1% | 66.3% | 70.0% | 71.1% | 72.6% | 71.6% | 68.0% | 63.1% | 52.4% | 39.1% | 29.5% | 22.6% | 16.9% | 12.0% | 9.8% | 3.3% |
| 4 | 5.5% | 7.8% | 12.1% | 18.5% | 27.6% | 33.3% | 37.5% | 41.3% | 44.6% | 48.4% | 52.4% | 58.0% | 61.9% | 68.0% | 72.8% | 74.4% | 74.8% | 73.8% | 71.0% | 68.5% | 62.5% | 52.1% | 40.1% | 30.8% | 23.5% | 15.4% | 11.7% | 8.7% |

FIG. 3B

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 |
|---|---|---|---|---|---|---|---|---|---|---|---|---|---|---|---|---|---|---|---|---|---|---|---|---|---|---|---|---|
| 1 | | | | | | Bank 1 11.3% | | | | | Bank 2 20.4% | | | | | | Bank 3 25.0% | | | | | Bank 4 12.6% | | | | | | |
| 2 | | | | | | | | | | | | | | | | | | | | | | | | | Bank 5 18.7% | | | |
| 3 | Bank 9 16.3% | | | | | | | Bank 8 45.0% | | | | | | Bank 7 67.8% | | | | | Bank 6 64.1% | | | | | | | | | |
| 4 | | | | | | | | | | | | | | | | | | | | | | | | | | | | |

US 12,426,138 B2

LED HEADLIGHT ASSEMBLY AND CONTROL

CROSS-REFERENCE TO RELATED APPLICATION

This application claims priority to U.S. Provisional Patent Application No. 63/043,467, entitled "LED HEADLIGHT ASSEMBLY AND CONTROL" and filed on Jun. 24, 2020, which is incorporated herein by reference in its entirety.

TECHNICAL FIELD

The present disclosure relates to vehicle headlight design and more specifically to light emitting diode (LED) headlight topology and matrix management.

BACKGROUND

Some vehicles use headlight designs composed of light emitting diodes (LEDs). LED functions in automotive headlights can include various LED activation patterns and brightness levels associated with different headlight settings. For example, the LED functions may include, but are not limited to: low beam spot, low beam wide, high beam, turn, and daytime running lamp (DRL). The LED function of low beam spot can be designed to illuminate a relatively close distance from a vehicle, but primarily focused on one spot or the area just in front of the vehicle. The LED function of low beam wide can be designed to illuminate a relatively close distance from a vehicle, but can be dispersed to shoot out in a cone from the lights so as to project light to the sides of the vehicle. Thus, the headlights disperse light in a wider pattern under low beam wide as compared to low beam spot. The LED function of high beam can be designed to illuminate a relatively far distance from a vehicle, allowing a driver to see further in the dark. The LED function of turn can be used to signal to oncoming traffic that the driver intends to turn in a direction. The daytime running lamp can be used to increase visibility of the car to other vehicles and people outside of the vehicle even if the lights are not necessary for the driver's illumination of the nearby area.

Other LED functions can include advanced features such as bend lighting when light beams are aimed to provide illumination around turns and corners. For example, an LED function may be designed to output light from the LEDs to point the light at an angle in which the vehicle is turning.

As shown in FIG. 1A, some current automobile headlight designs use a plurality of LEDs with each of the LEDs connected to an individual driver circuit that is used to activate and inactivate the connected LED. In the implementation shown in FIG. 1A, each driver circuit is connected to an individual LED, which in turn is connected to ground. Activating the driver circuit activates a single LED. Some LEDs connected in this way may be used within a vehicle to provide high beam front headlights which allow the driver within the vehicle to see long distances at night. Alternatively, some LEDs within a headlamp may be used as part of the low beams. Other LEDs within an automobile light assembly may be used as daytime running lights.

In some light emitting diode (LED) based headlight designs, individual LED functions are arranged in parallel and driven independently by separate LED drivers, meaning that a single LED driver is needed for each LED string. This parallel design can be cost ineffective and can lead to poor system efficiency because each of the LED strings may need sufficient power to drive the LED drivers. For example, more power can be converted to heat rather than light, leading to inefficiency in converting electrical energy into light.

SUMMARY

One embodiment is a system for controlling light emitting diodes (LEDs) in a vehicle. This embodiment includes an electronic control unit (ECU) which is configured to control current, voltage, or power to a first LED driver circuit; one or more LEDs electrically connected to the first LED driver circuit; and a first shunt connected to the ECU and configured to electrically bypass the one or more first LEDs to form one or more first LED functions. The system can include one or more second LEDs electrically connected to the first LED driver circuit. The system can include a second shunt connected to the ECU and configured to electrically bypass the one or more second LEDs to form one or more second LED functions. The first shunt can be controlled using time division multiplexing, angle domain multiplexing, or volt-second analysis to bypass the one or more first LEDs. The second shunt can be controlled using time division multiplexing, angle domain multiplexing, or volt-second analysis to bypass the one or more second LEDs. The ECU can be configured to prevent the total power supplied to the one or more first LEDs and the one or more second LEDs first shunt from reaching a predetermined threshold. The one or more first LEDs can comprise a plurality of LEDs which can be independently illuminated. The ECU can comprise a variety of profiles for illuminating sets of LEDs within the headlight assembly. The profiles can comprise profiles selected from the group consisting of: high beam, low beam spot, low beam wide, daytime running lights, and turn lights.

The present disclosure includes a method of controlling a light emitting diode (LED) matrix in a vehicle, the method comprising: receiving a signal to activate a set of LEDs in the vehicle; activating a first LED driver circuit to provide power to a set of LEDs; and controlling a first shunt connected to one or more of the LEDs in the set of LEDs to electrically bypass one or more of the LEDs in the set of LEDs. The method of can further comprise monitoring the power drawn by the first LED driver circuit and bypassing the one or more LEDs if the power draw is above a predetermined threshold. Activating the first LED driver circuit can comprise reading an LED lighting profile to determine which LEDs should be bypassed with the first shunt. The profile can be selected from the group consisting of: high beam, low beam spot, low beam wide, daytime running lights, or turn. Controlling the first shunt can comprise time division multiplexing, angle domain multiplexing, or volt-second analysis of the first shunt.

The present disclosure includes a method of controlling a light emitting diode (LED) matrix in a vehicle headlight assembly, the method comprising: identifying a first pixel and a second pixel of the LED matrix powered by an LED driver; pairing the first pixel with the second pixel, wherein the pairing is optimized such that a total intensity of the pairing is below a maximum intensity of any individual pixel powered by the LED driver; determining a threshold number of volt-seconds for the LED driver to output; determining a set of LED functions to associate with the LED driver; optimizing the set of LED functions of the vehicle headlight assembly; and associate the set of LED functions with the LED driver. The set of LED functions can be associated with an LED light profile comprising of one of the following LED light profiles: high beam, low beam spot, low beam wide, daytime running lights, or turn. Optimizing the set of LED functions of the vehicle headlight assembly can comprise optimizing by use of any combination of time division multiplexing, angle domain multiplexing, or volt-second analysis.

BRIEF DESCRIPTION OF THE FIGURES

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of disclosure.

FIG. 3A illustrates an example LED matrix arrangement.

FIG. 3B illustrates an example LED matrix arrangement grouped into banks.

DETAILED DESCRIPTION

Figure 1A:
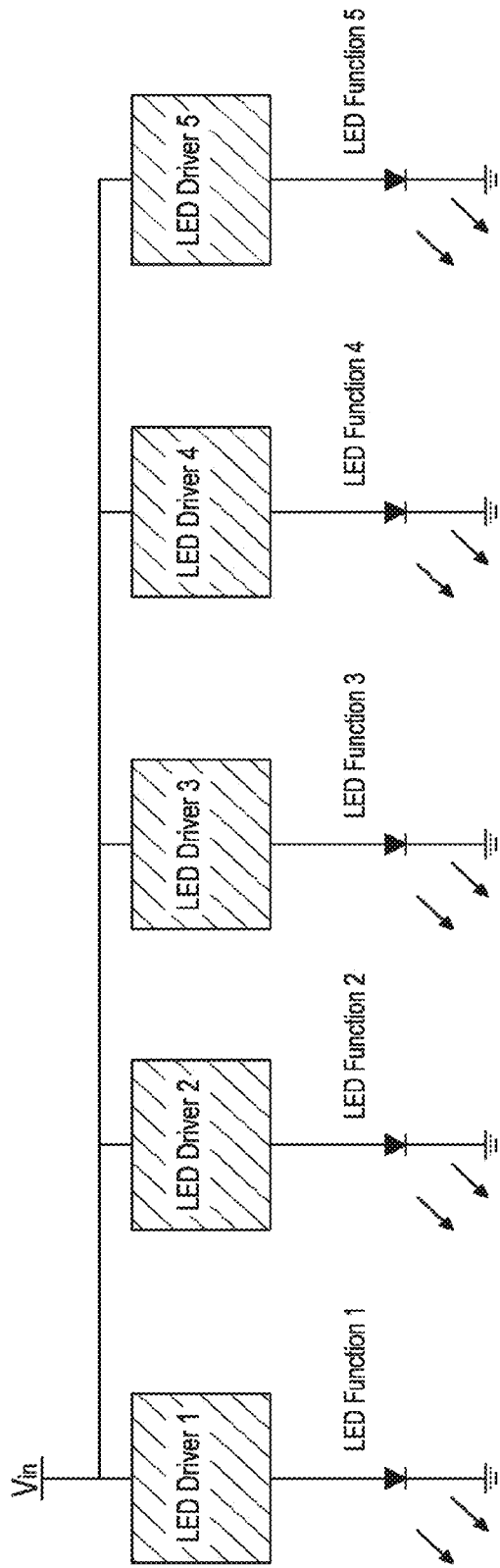
FIG. 1A illustrates a prior art example circuit diagram with parallel driver LEDs for each LED Function.

Various aspects of the systems, apparatuses, and methods are described more fully hereinafter with reference to the accompanying drawings. The teachings of this disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented, or a method may be practiced, using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The present disclosure includes methods and systems for creating, using, and controlling LED headlight topologies and matrices that require fewer parts, electricity, and power as compared to prior systems, while allowing for advanced features such as bend lighting. The disclosed methods and systems can enable easier manufacture of LED and other headlight topologies and easier repair of LED and other headlight topologies. Embodiments of the disclosed methods and systems can enable the use of smaller, lower power electrical systems, including control systems for LED and other headlight topologies. Other embodiments can take advantage of pixel pairing and time multiplexing, among other methods, to manage electrical flow to each LED to minimize the power needed over the circuit at given times, thus reducing the amount of material needed to create the LED headlight topology and related methods and systems for creating, using, and controlling the LED headlight topology.

In some implementations of the present system, groups of multiple LEDs are connected in series to the same LED driver and driven as a single LED string. This design allows assignment of multiple LED lights and functions to a single LED driver. In some implementations, the present system controls individual LED functions by using shunts to adjust the brightness of individual LEDs, or groups of LEDs, without affecting the brightness of other LEDs in the same LED string. The reduction in component count, for example by reducing the number of LED drivers, can reduce system costs, reduce printed circuit board (PCB) size, and increase space for other electrical components. This can allows a smaller LED headlight design to fit into a variety of headlight configurations and designs, and also decrease circuit complexity. The reduced complexity may lead to improvements in manufacturing, repair, and replacement of headlights utilizing the present system. Present embodiments may also lead to decreased enclosure or heatsink sizes with a particular headlamp.

Generally, a system with fewer LED drivers can also reduce the amount of energy and/or power needed to function, thus decreasing power draw and increasing batter life if power is drawn from a battery, such as with an electric vehicle. The presently disclosed series-shunt LED topology can thus result in improved electrical efficiency, size and weight reductions, and cost reductions. The series-shunt topology can be utilized to improve electrical efficiency and reduce cost in any high-powered LED lighting system, though the present disclosure focuses on its use in automotive headlights.

Figure 1B:
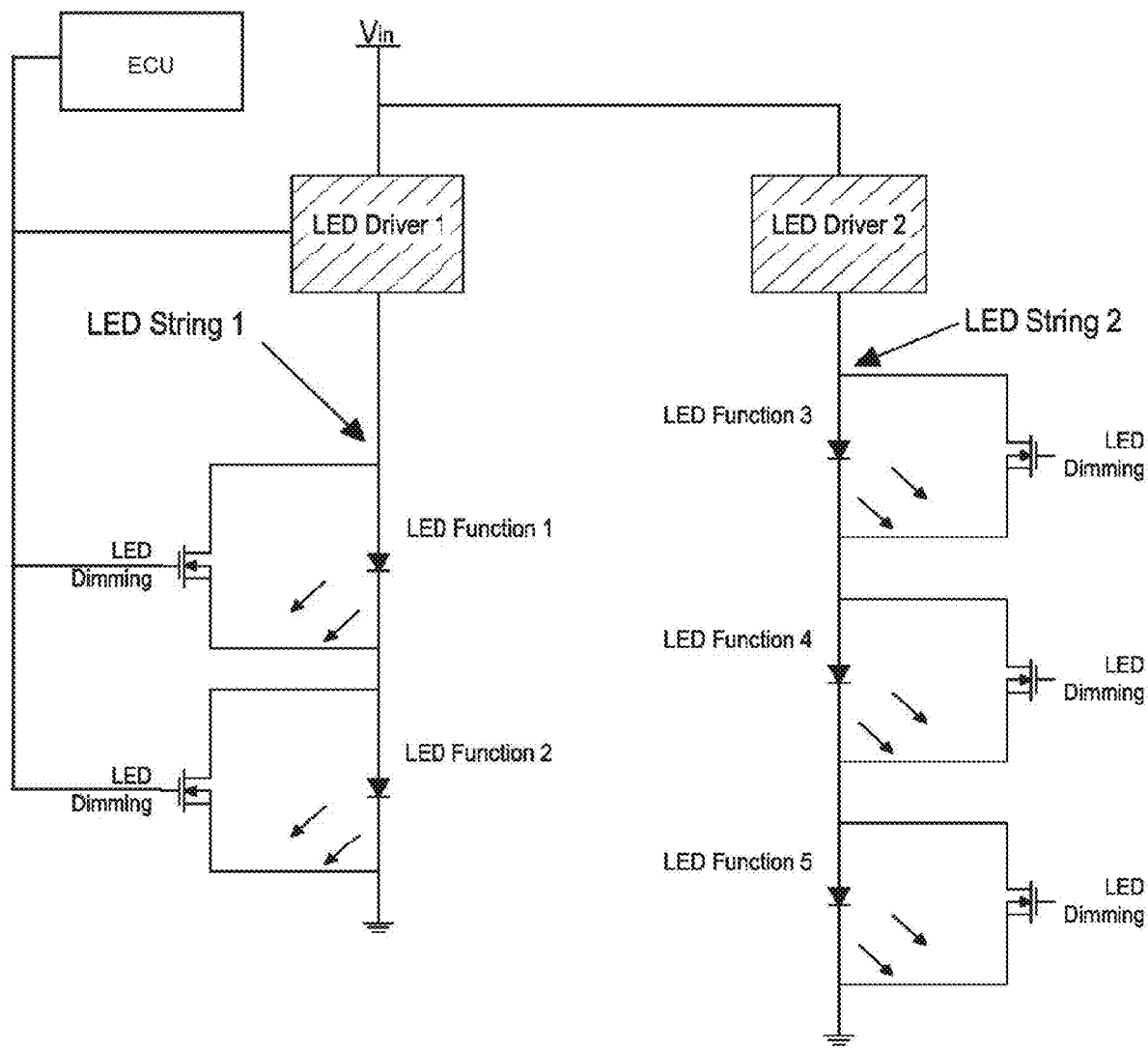
FIG. 1B illustrates an example circuit diagram with LED Strings where each LED String includes an LED driver, one or more LED Functions, and one or more shunts according to an embodiment of the invention.

As shown in FIG. 1B, a series-shunt topology supporting five LEDs only requires two driver circuits, LED Driver 1 and LED Driver 2. The series-shunt topology shown in FIG. 1B includes LED shunts for individual control of each LED. A shunt is placed on each LED function such that individual LED functions can be controlled independently by activating the shunt using a control system connected to each shunt. As shown, $V_{in}$ connects to LED Driver 1, which drives power to LED String 1. LED Driver 1 provides power to a first LED (LED Function 1) and a second LED (LED Function 2). Led Function 1 is also connected to a first LED dimming shunt which can shunt power past the LED and act to controllably dim or brighten LED Function 1. As shown in FIG. 1B, LED String 1 also includes LED Function 2 connected to a second LED dimming shunt on LED String 1. By activating each shunt, a control system can control the brightness of the first or second. LED in LED String 1 and only a single driver is needed to provide power and LED activation to the LED String 1.

As also shown in FIG. 1B, LED Driver 2 is connected to $V_{in}$ and configured to drive a set of three LEDs (LED Functions 1, 2, and 3). Each of the three LEDs is connected to an individual shunt circuit which can be used to dim or brighten each LED without affecting other LED functions in the same series.

To operate each shunt, a control system may turn off (disconnect) the shunt, which allows current to flow through that function's LED, thereby illuminating the LED. When the LED function's shunt is turned on, current can be shunted around the function's LEDs so the LEDs may not turn on because the power is bypassing the LEDs. Alternatively, shunts can be used to dim an LED, rather than turn it off completely.

To dim an LED, each shunt can be modulated at a frequency high enough to avoid noticeable flicker but low enough that switching losses can be insignificant. For example, the shunts could be modulated to function at a frequency of approximately 200 Hz. Alternatively, the shunts could be modulated to function at frequencies of about 100, 120, 130, 144 Hz, or frequencies above 200 Hz, depending on design constraints. The LED driver powering each string of LEDs can maintain a constant current through the series, such that the current through any given LED function can be controlled by its associated shunt. Shunts can therefore drive multiple LED functions from the same LED driver while maintaining full control over the relative brightness of each LED function. Shunts can also be useful because they can be configured to use very little PCB space and can be relatively low in complexity compared to other electrical components, such as LED drivers and boost converters.

Figure 1C:
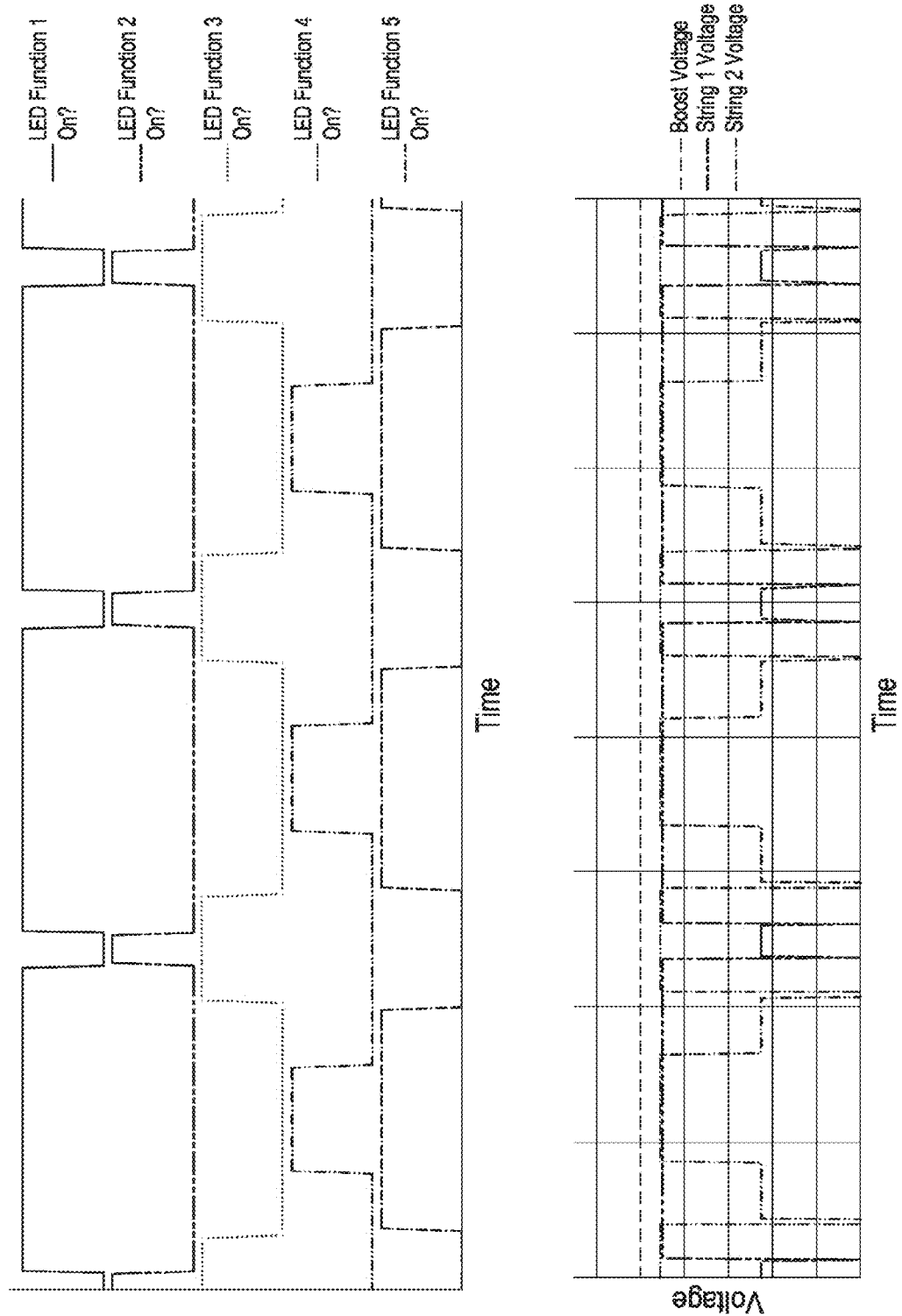
FIG. 1C illustrates an example timing diagram for operation of the example circuit diagram shown in FIG. 1B.

FIG. 1C is a timing diagram which illustrates example voltage levels for LED Functions 1, 2, 3, 4, and 5 of FIG. 1B and the corresponding voltage levels that can be seen on the two LED strings with reference to the example series-shunt topology illustrated in FIG. 1B. LED Functions 1 and 2 are in series and constitute LED String 1 and LED Functions 3, 4, and 5 are in series and constitute LED String 2. FIG. 1C also demonstrates how the different LED Functions can be multiplexed to avoid any overvoltage conditions of any LED String or LED Function. For example, LED Function 3 could be a daytime running lamp and LED Function 5 could be a Low Beam Wide light. These lights aren't used at the same time since the daytime running light runs in the day, and the Low Beam Wide Light runs in the dark. As such, the example time multiplexing shown in FIG. 1C shows how LED Function 3 can function as a daytime running lamp and is only turned on and activated when LED Function 5 as a Low Beam Wide headlamp is off and vice versa.

In another example, LED Function 1 and LED Function 2 could serve as a second daytime running lamp and a third daytime running lamp, respectively. As such, the example time multiplexing shown in FIG. 1C shows how LED Function 1 as the second daytime running lamp is only on when the LED Function 2 as the third daytime running lamp is off and vice versa. These examples illustrate how time multiplexing and/or interleaving an LED driver channel allows for additional LED functions without increasing the overall LED string's forward voltage.

Figure 2A:
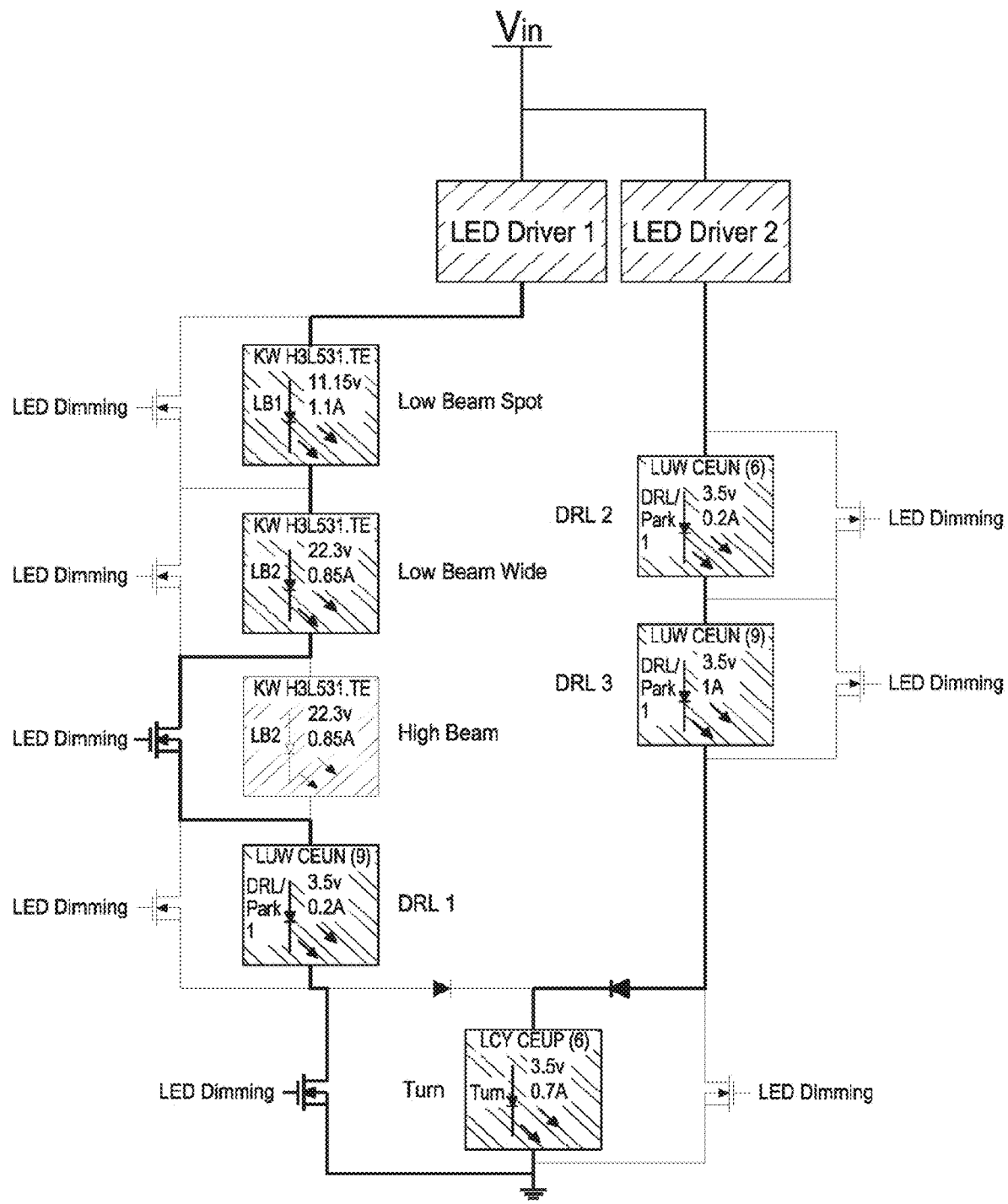
FIG. 2A shows an example of varying current flow through a series-shunt topology.
Figure 2B:
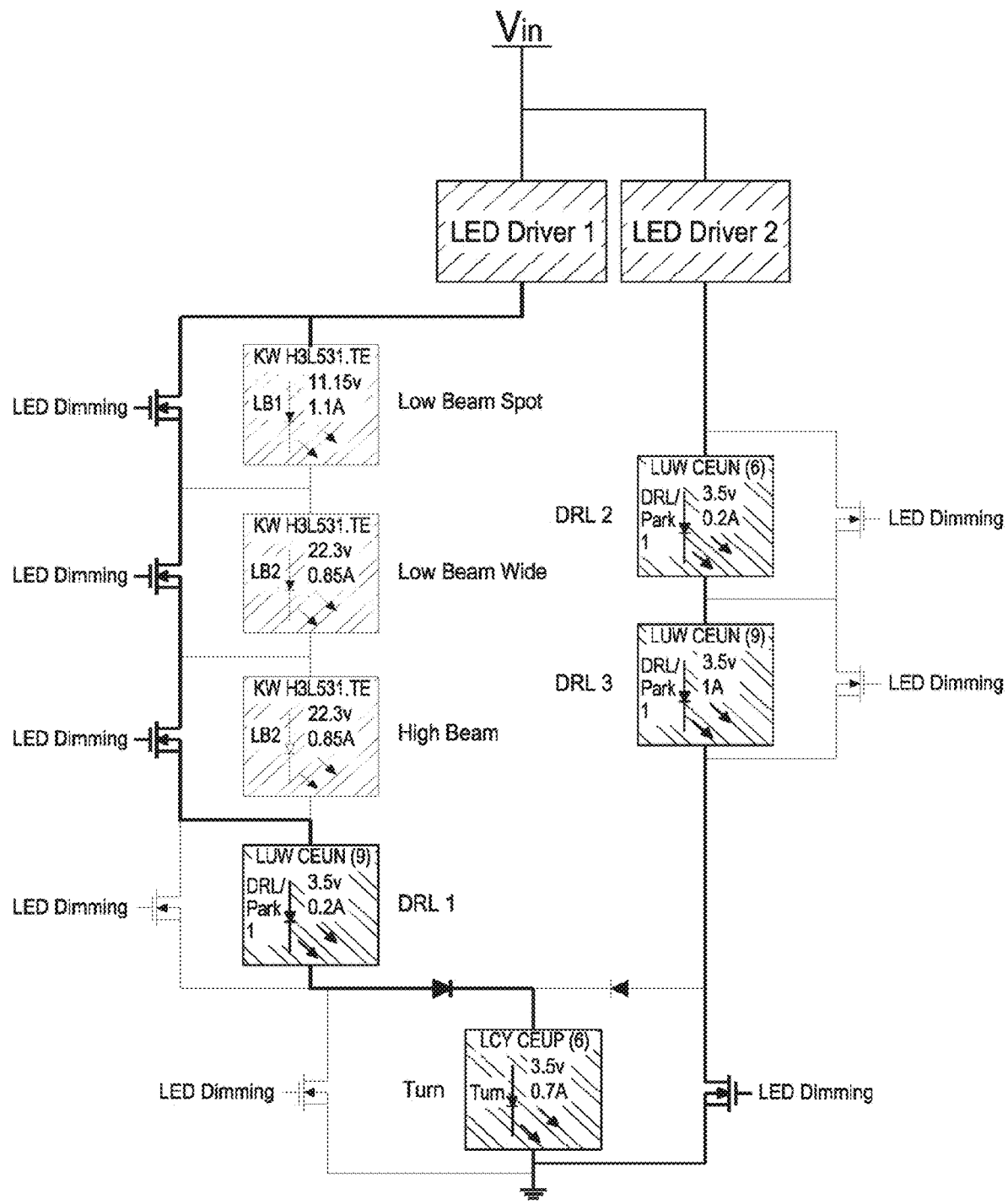
FIG. 2B shows another example of varying current flow through a series-shunt topology.

FIGS. 2A and 2B show examples of varying current flow through a series-shunt topology, guided by shunts. Varying the current flow can allow different combinations of LED functions, which may be used for specific situations. For example, the shunt activation of the High Beam LEDs depicted in FIG. 2A may avoid activating the high beam LED function for driving at night, to reduce risk to oncoming traffic. In another example, FIG. 2B depicts a combination of activated LED functions that may only include Daytime Running Lights (DRLs), for driving during the day. As shown in FIG. 2B, the LED Driver 1 is shunted to bypass the Low Beam Spot, Low Beam Wide and High Beam LEDS and only connect the DRL 1 LED functions to be activated. Similarly, the LED Driver 2 connects to DRL 2 and DRL3 so that all three DRL systems are activated as shown in FIG. 2B. FIGS. 2A and 2B also show how diodes and shunts can be used to power the turn signal from either LED driver.

The depictions in FIGS. 2A and 2B can reflect all LED functions activated by the LED drivers 1 and 2, but not all LED functions need to be activated during the same moment in time. FIGS. 2A and 2B are illustrative of example modes of the LED driver which can activate one or more LED functions at a time, and alternate and/or multiplex signals to each of the associated LED functions.

The series-shunt topology described herein may use time multiplexing to share a single LED driver between multiple LED functions. Time multiplexing can be used because the shunts allow for the individual control of different LED functions for interleaving and multiplexing the LED functions in time. Hysteretic LED drivers can suffer from poor electrical efficiency when there is a large differential between the input voltage to the LED driver and the output voltage from the LED driver. By stacking multiple LED functions and multiplexing them, the series-shunt topology can reduce the input-output voltage differential and increase LED driver electrical efficiency.

The reduction in input-output voltage differential can be attributed to the time multiplexing of LED functions driven by the same LED driver. For example, the LED driver 1 of FIG. 2A can drive DRL1 and Low Beam Wide because the max LED driver voltage will not include both Low Beam Wide and DRL1 at the same time. The LED driver will use time multiplexing to drive the DRL1 and the Low Beam Wide LED functions at different times. Similarly, DRL2 and DRL3 in FIG. 2B are never turned on at the same time, thus LED driver 2 can drive both DRL2 and DRL3 because both will never contribute to max LED driver voltage at the same time. Due to this increased electrical efficiency and/or reduction in power draw, boost converters used in the series-shunt topology can be physically smaller than boost converters in other topologies. It should be realized that the series-shunt topology can be implemented using any commercially available LED drivers.

In some implementations, LED matrix control systems result in large, expensive ECUs that are inefficient and may suffer large power/current surges which affect upstream components. In some implementations, LED matrix control methods generally align the start time of all pixels in an LED bank. As used herein, a "pixel" may be an individual LED. The pixel may be part of an LED bank which comprises a plurality of individual LEDs, each of which may be individually powered to provide a particular light pattern within the LED bank. By aligning the start time of all pixels in an LED bank, all pixels are turned on simultaneously, and turned off simultaneously as needed to achieve a desired brightness. This leads to maximum power/current being drawn from upstream components for short periods of time. To accommodate the surges, upstream components (e.g., wires, high side drivers, etc.) need to be sized up to accommodate the power draw and LED matrix modules need to be split into banks of LEDs, with a dedicated LED driver for each bank. Furthermore, there is more electrical inefficiency from a higher input-output voltage differential. This leads to each LED driver controlling a small section of LEDs. This design utilizes LED drivers inefficiently and requires several LED drivers to drive a matrix. The present control method can allow for lower component count, higher system electrical, component, and space efficiency, and lower system cost. The present system and method can combine multiple banks to form channels. Instead of using one LED driver per bank, the present method can use one LED driver per channel, thereby reducing the number of LED drivers needed. The system and method can further increase LED system efficiency by grouping pixels to utilize LED drivers more efficiently. This control of these LEDs can also limit the occurrence of surge currents by interleaving the activation periods of individual pixels. Embodiments of the system may be used to control any LED matrix, including, but not limited to, the series-shunt LED topology described above.

FIGS. 3A and 3B illustrate an example LED matrix arrangement. FIG. 3A shows a 28×4 matrix of individual pixels, where each pixel can be operated at a set brightness within a light unit. The brightness of a given pixel may be determined by a currently-activated LED function (for example, high beam, low beam spot, or daytime running lights). Another LED function can be bend lighting, a feature which can change headlight directionality when a vehicle prepares to, is in the process of, or completes a turn around a corner or adjusts to a bend in the road. In prior art implementations, bend lighting was achieved mechanically where a motor rotates the headlight hardware such that the light beam is angled towards the bend. In the present embodiments, bend lighting is achieved electronically by adjusting pixel brightness to focus the light beam toward the bend. In some implementations, pixels facing the bend may increase in brightness while the pixels facing away from the bend may dim. In some implementations, bend lighting can be achieved by creation of an interference pattern by the light emitted by individual pixels based on the brightness of individual pixels.

FIG. 3B shows a possible configuration of how the individual pixels of FIG. 3A may be grouped into banks. As shown in FIG. 3B, the LEDs may be grouped into nine banks of LED lights, where each bank is individually controllable. In some embodiments, FIG. 3A describes the utilization of each of the pixels while FIG. 3B describes the utilization of banks. These nine banks may be further grouped into channels. To form channels, banks drawing more power may be paired with banks drawing less power, such that the amount of power being used may never exceed a maximum value for the associated LED driver that will drive power to the multiple banks grouped to form a channel. In some implementations, one or more banks that have lower utilization will be paired with one or more banks with higher utilization such that the power needed for the banks does not exceed the maximum power that the LED driver can supply. The pixels in each bank can also be individually interleaved to smooth out large power/current surges that occur. Under the present control method, one LED driver can drive each channel. Thus, the present control method can maximize LED driver utilization while still implementing advanced features like bend lighting, which require very dynamic control of pixel brightnesses.

In some implementations, one or more banks that have lower utilization will be paired with one or more banks with higher utilization such that the power needed for the banks when performing any particular LED function does not exceed the maximum power that the LED driver can supply. Utilization can be measured in average power draw, brightness, or percentage of time where a threshold amount of current is usually drawn. The pixels in each bank can also be individually interleaved to smooth out large power/current surges that occur during any particular LED function.

Figure 4A:
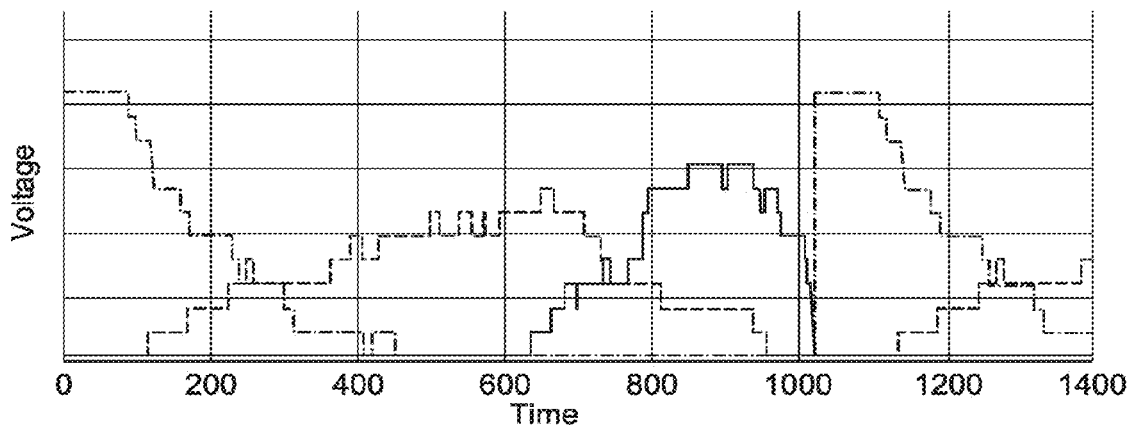
FIG. 4A illustrates example voltage measurements over time for three interleaved LED banks.

FIGS. 4A and 43 illustrate voltage levels in an LED matrix where pixel activation times are interleaved. FIG. 4A depicts example voltage measurements over time for three interleaved LED banks which can be controlled by a single LED driver where the LED banks are configured to form a channel. With interleaving, LED banks do not need to activate at the same time. Instead, each LED bank can be only activated when needed, so the power surges can be spread out in time, thereby avoiding large surges. An interleaved LED matrix can support overlaps in LED bank activation by grouping together banks that, even when activated at the same time, do not draw more power than the driver can support.

Figure 4B:
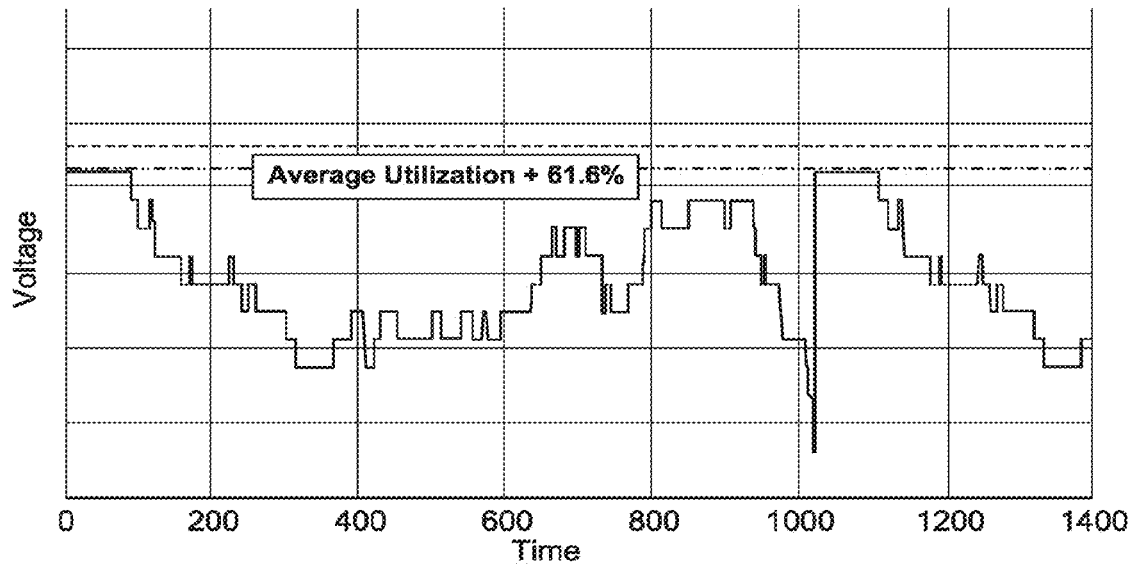
FIG. 4B illustrates example voltage measurements over time for an LED channel

FIG. 4B illustrates example voltage measurements over time for an LED channel. The channel can be formed by grouping at least two LED banks together. Each channel can be controlled by a dedicated LED driver. With interleaving, the LED driver may be used more of the time, in contrast to other methods which leave LED drivers idle (at 0 voltage) for relatively long periods between LED function changes. As shown in the figure, interleaving can minimize the peak channel voltage and can prevent the system from exceeding the driver's maximum supported voltage.

Figure 5:
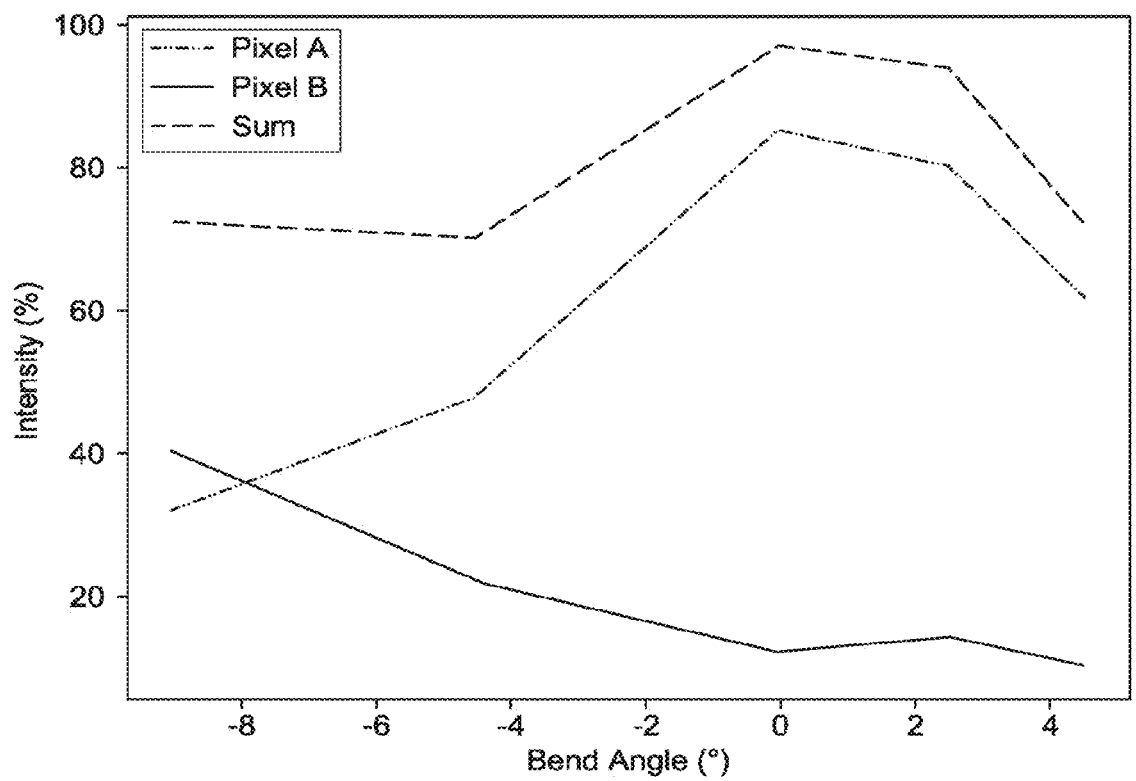
FIG. 5 illustrates a graph depicting how pixel pairing may be optimized in the angular domain.

FIG. 5 is a graph depicting how pixel pairing may be optimized in the angular domain for bend lighting. As described above, electronic bend lighting may require dynamic dimming and brightening of individual pixels. FIG. 5 shows the bend angle and intensity for Pixel A, Pixel B and the sum of their intensities. The pixel intensities may depend on the bend angle and may change as the bend angle changes. In some implementations, bend lighting might involve beam patterns for bend angles from −10 degrees to 5 degrees, or −5 degrees to 10 degrees depending on whether the beam is emanating from the left side or the right side of the vehicle. In the example, −10 degrees can be −10 degrees in relation to the light shining straight ahead and can be −10 degrees to the left or right. In some implementations, these bend angles can be configured to change at a resolution of 0.1 degrees (for example, allowing bend angles of 0, 0.1, 0.2, 0.3, and 0.4 degrees, and the like). An optimized pixel pairing can allow adjustment of each pixel's intensity during LED functions while ensuring the pixel pair never exceeds 100% combined intensity. Intensity can refer to voltage, current, and/or power supplied to the pixel or brightness of light emanating from the pixel. Note also that intensity of a pixel can be related to the on-time of a pixel when implementing pulse-width modulation to supply a pixel with power. For example, each pair of pixels cannot be supplied with more than the maximum voltage, current and/or power than can be supplied to a single pixel at any given time. In some implementations, each pair of pixels cannot emanate light more than the maximum light that can be emanated by a single pixel. A pixel pair with an intensity of 100% for all angles can mean that the two pixels are perfectly matched, since any off-time in one pixel is filled in by the on-time of the other.

As illustrated in FIG. 5, the pixels may not necessarily add up to 100% intensity for all angles, but the ideal sum should be as close to 100% as possible without exceeding 100%. By trying to optimize all pixel pairs to 100% intensity, the input-output voltage differential can be minimized to increase electrical efficiency and other factors disclosed herein. For example, some pixels can have a max intensity at negative angles and others can have a max intensity at positive angles. These pixels with maximum intensities at opposite angles may be paired together such that when one is dim, the other is bright. Paired pixels do not have to be adjacent to each other or laterally adjacent to each other. Alternatively, intensities of the pixel pair can be optimized to sum to as close to 200% where 200% represents the maximum intensity of two pixels that the LED drivers are designed to power.

Pixel pairing can be optimized in the angular and time domains. For example, an angular domain optimization would pair pixels based on utilization over angles of light bending. In another example, a time domain optimization would pair pixels based on utilization during time multiplexing. Pixel pairing can be optimized over both angular and time domains at the same time. Pixel pairing can also be optimized in the volt-second domain (described herein).

Figure 6:
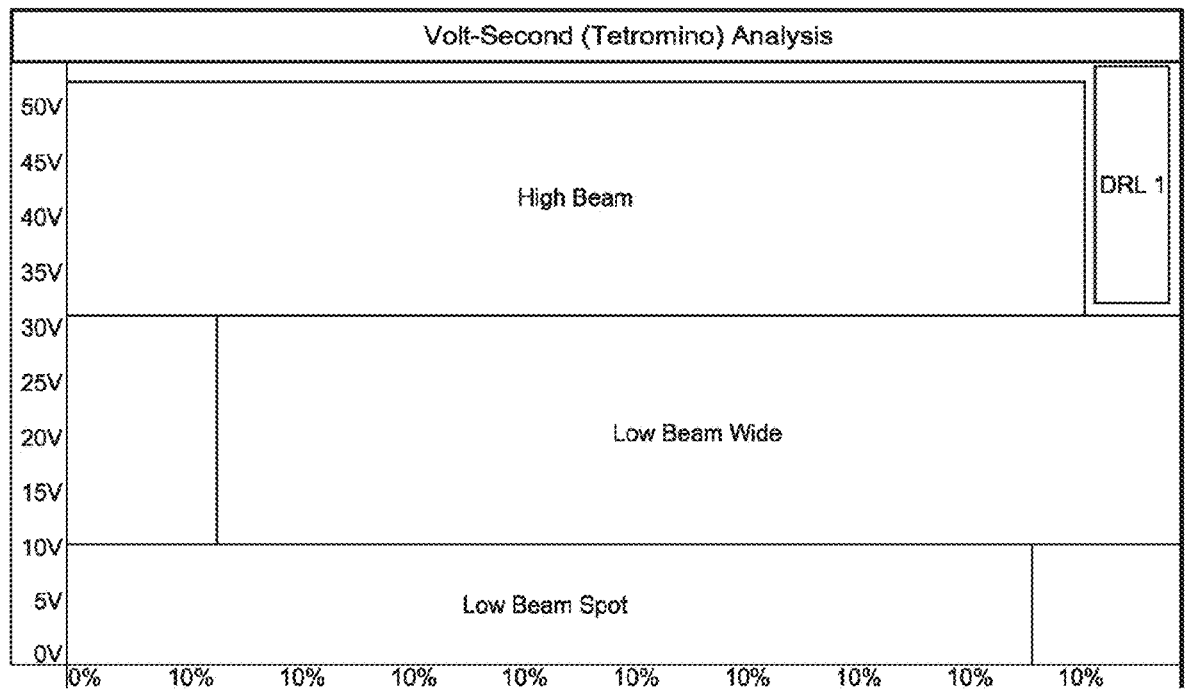
FIG. 6 illustrates a graph showing volt-second analysis used to maximize utilization of LED drivers.

FIG. 6 is a graph showing volt-second analysis used to maximize utilization of LED drivers. Volt-second analysis (also known as Tetromino analysis) can be used to optimize an LED driver channel when multiplexing multiple LED functions. Volt-second analysis may view the max capability of the LED driver in terms of an area with units of Volt-seconds, represented by the rectangular sections in FIG. 6. Using Volt-second analysis, an LED driver (or a controller of an LED driver) can determine the LED function to drive by examining the input voltage and the PWM of the input voltage. For example, the example LED driver system with the graph of volt-second analysis captured in FIG. 6 will drive the high beam LED function if the input voltage is between 30 and 50V and the PWM of the input voltage is between 0 and 90%. That same example LED driver system captured in FIG. 6 will drive the low beam wide LED function if the input voltage is between 10V and 30 V and the PWM of the input voltage is between 10% and 100%. Using Volt-second analysis can lead to simpler design of control schemes for multiple LED functions driven by a single LED driver. An LED driver can support as many different functions as possible, until its volt-second capacity is fully occupied. Increasing the LED driver output voltage can increase the total available volt-second area. Increasing the LED driver current can decrease the volt-second area required for each function, thereby allowing more functions per LED driver. Thus, LED driver utilization (e.g. the area of the LED driver volt-second area that is occupied by an LED function) may be maximized by adjusting the driver voltage and current.

Figure 7A:
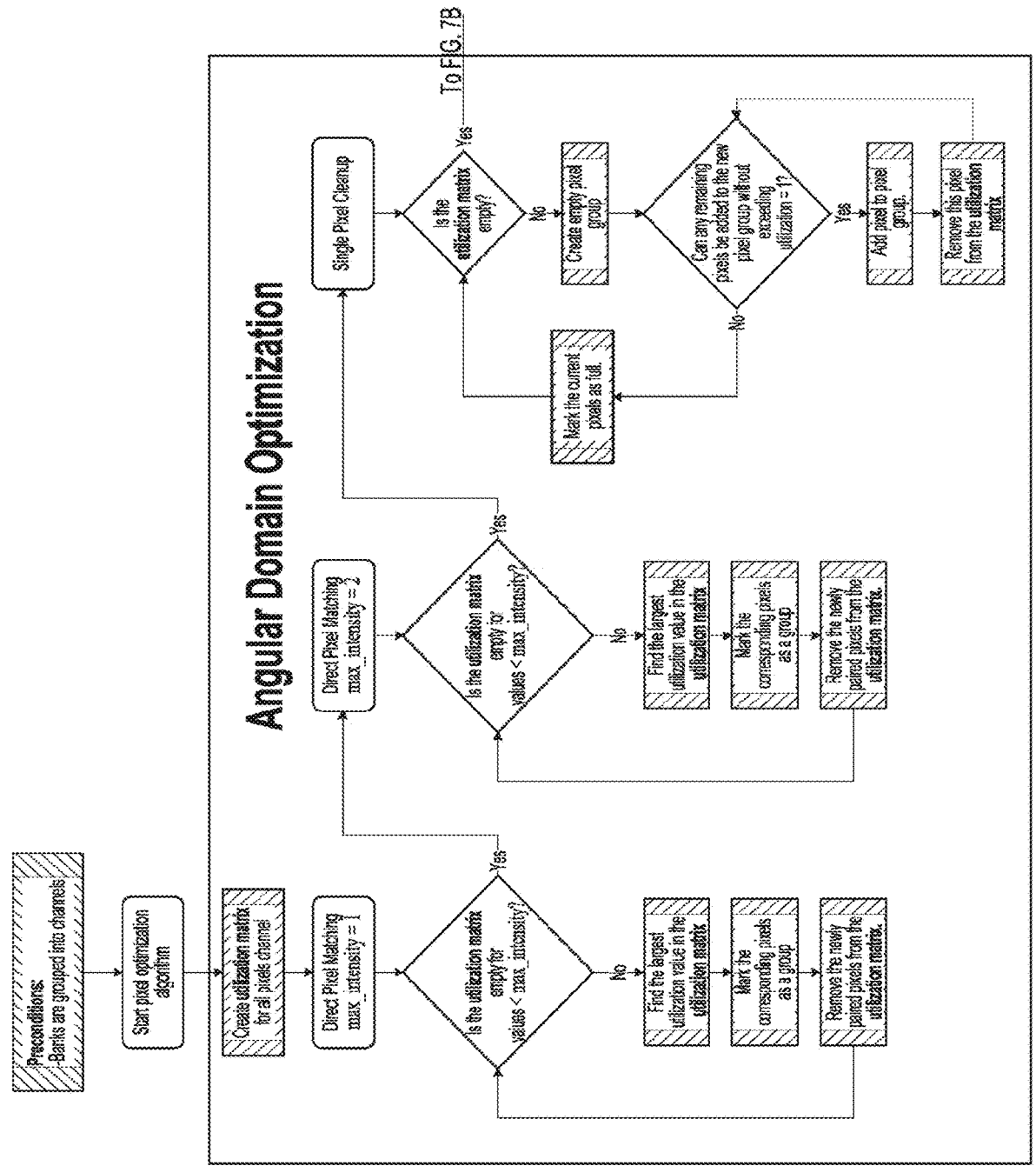
FIG. 7A illustrates an example flowchart demonstrating an example series of steps in optimizing pixel pairing.
Figure 7B:
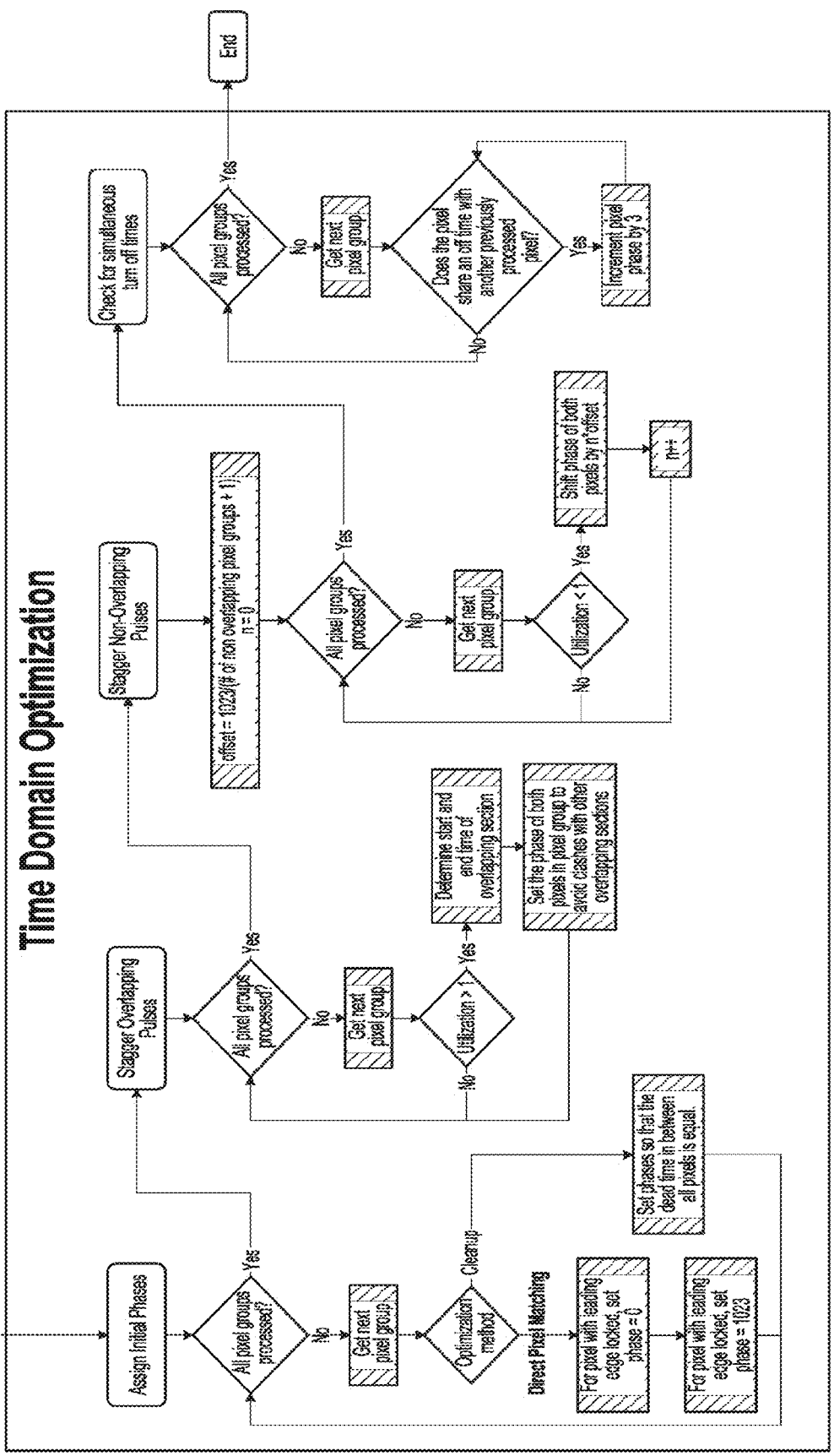
FIG. 7B illustrates example flowchart demonstrating an example series of steps in optimizing pixel pairing.

FIGS. 7A and 7B are examples flowcharts demonstrating an example series of steps in optimizing pixel pairing. The flowchart helps ensure that pixels are paired as efficiently as possible for advanced features such as bend lighting. This method will also allow us to assign a numerical value to each possible pair of pixels in a channel powered by an LED driver, where the numerical value represents how well the pixels are paired.

FIG. 7A represents an example series of steps that can be described as angular domain optimization. Angular domain optimization describes the utilization of each pixel in a channel (for example, for advanced features such as bend lighting) and uses that utilization to determine pixel pairing.

FIG. 7B represents an example series of steps that can be described as time domain optimization. Time domain optimization describes the utilization of pixels, banks, and/or channels and their respective peak voltages or currents across periods of time. Time domain optimization may use multiplexing or interleaving techniques to ensure that no peak voltages or currents are exceeded in the electrical system (whether pixel, bank, or channel peak voltages or currents) while providing the necessary voltage and/or current to LEDs for the target illumination or beam patterns and brightness.

The foregoing disclosure is not intended to limit the present disclosure to the precise forms or particular fields of use disclosed. As such, it is contemplated that various alternate implementations and/or modifications to the present disclosure, whether explicitly described or implied herein, are possible in light of the disclosure. Having thus described implementations of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific implementations. However, as one skilled in the art will appreciate, various implementations disclosed herein can be modified or otherwise implemented in various other ways without departing from the spirit and scope of the disclosure. Accordingly, this description is to be considered as illustrative and is for the purpose of teaching those skilled in the art the manner of making and using various implementations of the disclosed motor assembly. It is to be understood that the forms of disclosure herein shown and described are to be taken as representative implementations. Equivalent elements, materials, processes or steps may be substituted for those representatively illustrated and described herein. Moreover, certain features of the disclosure may be utilized independently, of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various implementations disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", "third", "primary", "secondary", "main" or any other ordinary and/or numerical terms, should also be taken only as identifiers, to assist the reader's understanding of the various elements, implementations, variations and/or modifications of the present disclosure, and may not create any limitations, particularly as to the order, or preference, of any element, implementation, variation and/or modification relative to, or over, another element, implementation, variation and/or modification.

It will also be appreciated that one or more of the elements depicted in the drawings/figures can also be implemented in a more separated or integrated manner, or even removed or rendered as inoperable in certain cases, as is useful in accordance with a particular application. Additionally, any signal hatches in the drawings/figures should be considered only as exemplary, and not limiting, unless otherwise specifically specified.

What is claimed is:

1. A system for controlling light emitting diodes (LEDs) in a vehicle, comprising:
   an electronic control unit (ECU) which is configured to control current, voltage, or power to an LED driver circuit;
   a first LED and a second LED electrically connected to the LED driver circuit;
   a first shunt connected to the ECU and configured to control an intensity of the first LED to control a first LED function; and
   a second shunt connected to the ECU and configured to control an intensity of the second LED to control a second LED function;
   the ECU being configured to:
      pair the first LED with the second LED, wherein a total intensity of the pairing of the first LED with the second LED is below a maximum intensity of any individual pixel powered by the LED driver circuit;
      determine a threshold number of volt-seconds for the LED driver circuit to output; and
      output a number of volt-seconds from the LED driver circuit that is below the threshold number.

2. The system of claim 1, wherein the first shunt is controlled using time division multiplexing, angle domain multiplexing, or volt-second analysis.

3. The system of claim 1, wherein the second shunt is controlled using time division multiplexing, angle domain multiplexing, or volt-second analysis.

4. The system of claim 1, wherein the ECU is configured to prevent a total power supplied to the first LED and the second LED from reaching a predetermined threshold.

5. The system of claim 1, wherein the ECU comprises a plurality of profiles for illuminating sets of LEDs within a headlight assembly.

6. The system of claim 5, wherein the plurality of profiles comprises profiles selected from the group consisting of:
   high beam, low beam spot, low beam wide, daytime running lights, and turn lights profiles.

7. A method of controlling a light emitting diode (LED) matrix in a vehicle, the method comprising:
   receiving a signal to activate a set of LEDs in the vehicle electrically connected to an LED driver circuit, the set of LEDs comprising a first LED and a second LED;
   controlling a first shunt connected to the first LED to control an intensity of the first LED;
   controlling a second shunt connected to the second LED to control an intensity of the second LED;
   pairing the first LED with the second LED, wherein a total intensity of the pairing of the first LED with the second LED is below a maximum intensity of any individual pixel powered by the first LED driver;
   determining a threshold number of volt-seconds for the LED driver circuit to output;
   outputting a number of volt-seconds from the LED driver circuit that is below the threshold number; and
   activating the LED driver circuit to provide power to the set of LEDs.

8. The method of claim 7, further comprising monitoring the power drawn by the first-LED driver circuit and bypassing the first LEDs if the power drawn is above a predetermined threshold.

9. The method of claim 7, wherein activating the first LED driver circuit comprises reading an LED lighting profile to determine intensity values for the first LED and second LED.

10. The method of claim 9, wherein the LED lighting profile is selected from the group consisting of:
    high beam, low beam spot, low beam wide, daytime running lights, or turn.

11. The method of claim 7, wherein controlling the first shunt comprises time division multiplexing, angle domain multiplexing, or volt-second analysis of the first shunt.

12. A method of controlling a light emitting diode (LED) matrix in a vehicle headlight assembly, the method comprising:
    identifying a first LED and a second LED of the LED matrix powered by an LED driver;
    pairing the first LED with the second LED, wherein a total intensity of the pairing of the first LED with the second LED is below a maximum intensity of any individual pixel powered by the LED driver;
    determining a threshold number of volt-seconds for the LED driver to output; and
    outputting a number of volt-seconds from the LED driver that is below the threshold number.

13. The method of claim 12, further comprising determining a set of LED functions to associate with the LED driver.

14. The method of claim 13, further comprising associating the set of LED functions with the LED driver.

15. The method of claim 13, wherein the set of LED functions can be associated with an LED light profile selected from the group consisting of:
    high beam, low beam spot, low beam wide, daytime running lights, or turn signal profiles.

16. The method of claim 12, wherein outputting the volt-seconds comprises any combination of time division multiplexing, angle domain multiplexing, or volt-second analysis.

17. The method of claim 12, further comprising:
    preventing a total power supplied to the first LED and the second LED from reaching a predetermined threshold.

18. The method of claim 17, wherein:
    preventing the total power supplied to the first LED and the second LED from reaching a predetermined threshold comprises:
       monitoring the power drawn by the LED driver; and
       bypassing the first LED if the power drawn is above the predetermined threshold.

19. The method of claim 17, wherein:
    pairing the first LED with the second LED comprises:
       reading an LED lighting profile to determine intensity values for the first LED and second LED.

20. The method of claim 19, wherein the LED light profile is selected from the group consisting of:
 high beam, low beam spot, low beam wide, daytime running lights, or turn signal profiles.

* * * * *

UNITED STATES PATENT AND TRADEMARK OFFICE
CERTIFICATE OF CORRECTION

PATENT NO. : 12,426,138 B2  
APPLICATION NO. : 18/012202  
DATED : September 23, 2025  
INVENTOR(S) : Ross Harvey Page 1 of 1

It is certified that error appears in the above-identified patent and that said Letters Patent is hereby corrected as shown below:

In the Claims

In Column 12, Line 4, in Claim 7, delete "first LED driver" and insert --LED driver circuit-- therefor In Column 12, Line 12, in Claim 8, delete "first-LED" and insert --LED-- therefor In Column 12, Line 13, in Claim 8, delete "LEDs" and insert --LED-- therefor Signed and Sealed this  
Twenty-third Day of December, 2025

John A. Squires  
*Director of the United States Patent and Trademark Office*